AEROSOL FILTER

Original Filed March 31, 1964 2 Sheets-Sheet 1

INVENTORS.
ROGER L. SCHONEWALD
OLIVER L. I. BROWN
BY MASON P. WILSON, JR.
Robert B. Harmon
ATTORNEY

AEROSOL FILTER

Original Filed March 31, 1964 2 Sheets-Sheet 2

INVENTORS.
ROGER L. SCHONEWALD
OLIVER L. I. BROWN
MASON P. WILSON, JR.
BY Robert B. Harman
ATTORNEY United States Patent Office Re. 26,927
Reissued June 30, 1970

26,927
AEROSOL FILTER

Roger L. Schonewald, Belle Mead, N.J., Oliver L. I. Brown, Waterford, Conn., and Mason P. Wilson, Jr., Kingston, R.I., assignors to General Dynamics Corporation, a corporation of Delaware Original No. 3,289,397, dated Dec. 6, 1966, Ser. No. 356,278, Mar. 31, 1964. Application for reissue Oct. 11, 1968, Ser. No. 767,008
Int. Cl. B01d *46/16*
U.S. Cl. 55—392 6 Claims

Matter enclosed in heavy brackets [ ] appears in the original patent but forms no part of this reissue specification; matter printed in italics indicates the additions made by reissue.

*ABSTRACT OF THE DISCLOSURE*

*A mechanical aerosol filtering apparatus is described having an outer drum like housing and a perforated inner drum coaxial with each other. A tubular body of filter material is disposed around the inside diameter of the inner drum. A shaft is connected to the inner drum so as to rotate the inner drum at selectable speeds. An air flow inlet port is disposed near one end of the drum and permits air to be sucked into the drum by the fan action of the rotating inner drum. An exhaust air port is disposed on the side wall of the outer drum near the end thereof opposite the inlet port. Inflowing gas then spirals continuously through the axial length of the filter body as the shaft rotates so that collisions between aerosol particles and the filter body and among the particles themselves occur causing the particles to be thrown out of the filter material and out of the inner drum so as to impact the inner wall of the outer drum andflow in liquid form to a collection spigot in the outer drum.*

This invention relates to devices for filtering aerosols from a gaseous stream, and more specifically to improvements in centrifugal filters for removing minute suspended particles from a gaseous medium.

An aerosol is a dispersion of minute particles, either liquid or solid, in a gaseous medium. Typical examples of aerosols are fog, smoke, and pollen. Essentially, though aerosols appear to float in the medium, they are inherently unstable and over a prolonged period of time will tend to disappear through evaporation or precipitation. Precipitation is most effective where rapid removal is desired and may occur through impaction, agglomeration, coalescence or simple settling in a gravitational or centrifugal field.

Because of the minute size of the suspended particles, prior art devices have generally suffered from the problem of effecting a thorough and efficient separation. Generally such prior art devices for producing particle settling have been either of the so-called "high efficiency," electrostatic precipitator, or centrifugal filter types. However, "high efficiency" filters are not self cleaning and clog rapidly with a dense aerosol. Further, such filters cause relatively large pressure drops in the fluid stream. The electrostatic precipitator suffers the disadvantages of pressure drop, of employing high voltages which may be hazardous in an explosive atmosphere, and of producing potentially toxic concentrations of ozone. The prior art centrifugal filter has not lent itself well to high flow applications because of repetitive change in path of the fluid stream and several stages of filters to be traversed thereby, thus involving complexity of structure in addition to undesirable pressure drop. The filter apparatus of the present invention overcomes these difficulties by utilizing a mechanical principal wherein agglomeration of solid particles and coalescence of liquid particles is rapidly and efficiently accomplished whereby the aggregate is removed from the flow stream.

It is therefore a principal object of this invention to provide improvements in aerosol filters for separation and removal of minute suspended particles of the aerosol from the gas stream.

Another object of this invention is to provide an improved filter structure for rapid and efficient removal of minute particles from aerosol suspensions moving through the structure.

A further object of this invention is to provide an improved centrifugal filter for removal of particles suspensions from gaseous flow streams without subjecting the streams to undue pressure drop through the filter structure.

A still further object of this invention is to provide an aerosol filter structure in which minute suspended particles of the aerosol will be subjected to rapid impingement by the surfaces of the filter structure and also upon a series of baffle plates whereby the solid and/or liquid aggregate may be quickly and efficiently removed from the gaseous stream.

Other objects, features, and attendant advantages will become apparent from a perusal of the following specification taken in connection with the accompanying drawings in which.

Figure 1:
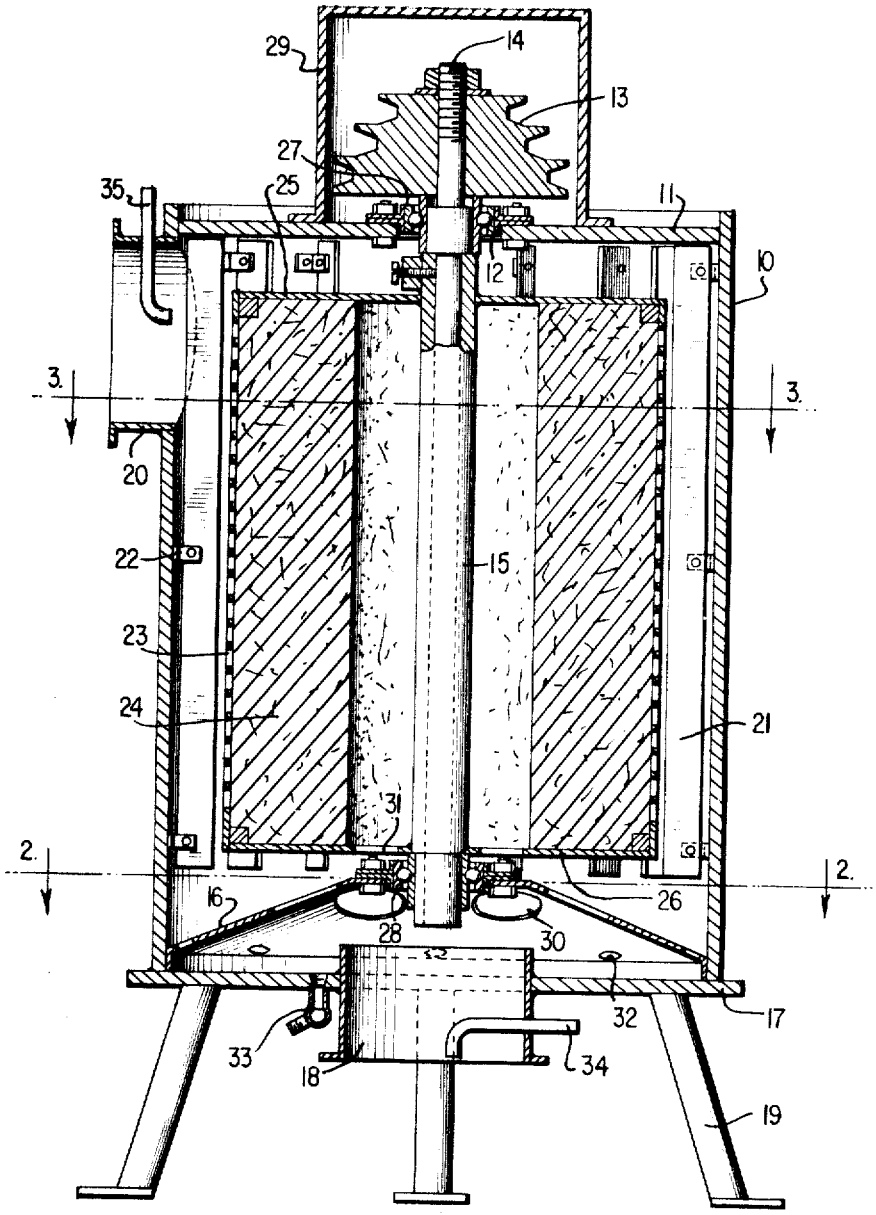
FIG. 1 is a sectioned view in elevation of a preferred embodiment of the filter structure.
Figure 2:
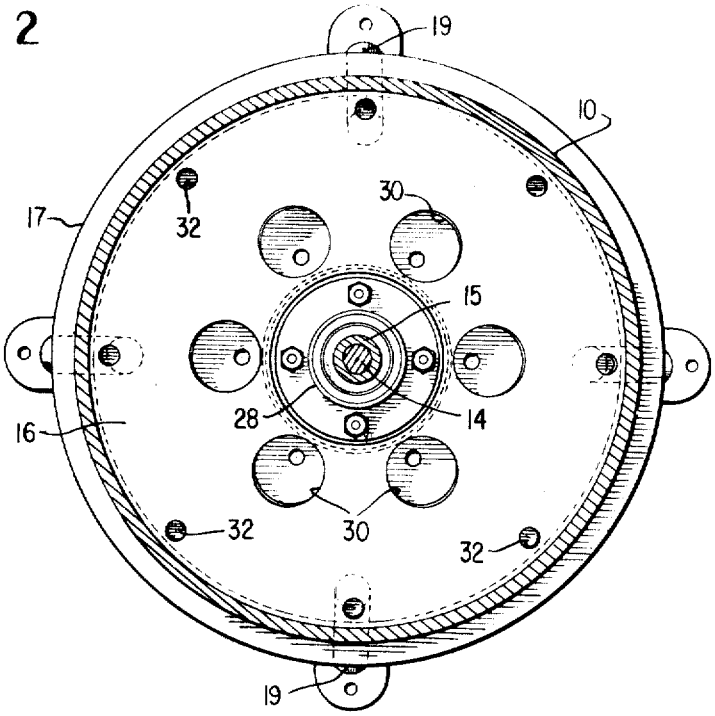
FIG. 2 is a view of the structure taken along the line 3—3 of FIG. 1.
Figure 3:
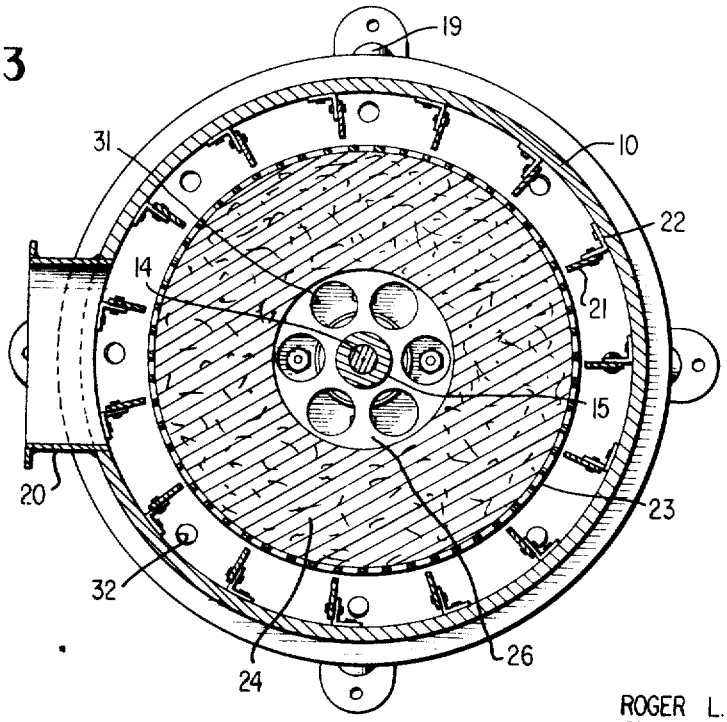
FIG. 3 is a view of the structure taken along the line 3—3 of FIG. 1.

Referring to the drawing, wherein like reference numerals are used to identify the same parts appearing in the several views, there is illustrated a cylindrical chamber 10 which is closed at the top by a circular upper plate 11 fastened to the chamber by suitable means, for example, a press fit, to allow easy removal therefrom. Mounted above a centrally located aperture 12 in plate 11 is a pulley drive 13. A downwardly extending shaft 14 passes through the pulley drive and along the central axis of the chamber. The shaft 14 is suitably secured to the pulley drive 13. A collar 15 encloses the shaft and extends the length thereof from the upper plate 11 to a point below the inwardly directed flange of a truncated cone 16. The cone is also downwardly flanged at its maximum diameter and is suitably connected thereby to the inner surface of chamber 10. The entire chamber is closed by a circular lower plate 17 through which an inlet duct 18 extends for introduction of aerosol flow into the chamber. A plurality of legs 19 or other suitable supporting means are fastened to lower plate 17. Interfastening of the plate 17, chamber 10, legs 19 and inlet duct 18 may be accomplished in any suitable manner, for example by welding. An outlet duct 20 extends through an aperture along the upper portion of the chamber 10 as a means of egress for the gaseous flow stream.

Evenly spaced and suitably secured around the inner surface of the chamber 10 are a plurality of radial baffles or impaction plates 21. The impaction plates may be fastened, for example, by angled flanges 22, and extend from a point just below upper plate 11 to approximately a horizontal line along the upper portion of truncated cone 16. A perforated drum 23, of diameter slightly less than the distance between inner edges of oppositely mounted impaction plates 21, contains a hollow cylindrical mass of fibrous media 24 extending the length thereof. A pair of circular plates 25, 26 close the drum. Upper plate 25 and lower plate 26 have centrally located holes for accommodating collar 15, the collar being suitably fastened to plates 25, 26 as, for example, by welding. Collar 15 may be secured to shaft 14 by means of set screws or other suitable means, and is further secured in a pair of bearings, upper bearing 27 being fastened to plate 11 and lower bearing 28 to the inward flange of cone 16. The connection of drum 23, plates 25, 26, collar 15, shaft 14 and pulley drive 13 is such that when a plurality of belts (not shown) are connected between the pulley drive and a motor (not shown), that portion of the structure can be rotated at any of several speeds depending on the character of the [areosol] *aerosol*. Although a pulley and belt arrangement has been described, any suitable driving structure may be used, for example, a gear coupling between shaft 14 and the motor. A housing 29 partially encloses pulley drive 13 for protective purposes.

Operation of the device is substantially as follows: the gaseous stream containing the aerosol is introduced under pressure into the chamber structure through the inlet duct 18. Because of the shape of conical surface 16 the flow is directed through the holes 30, 31 and thereupon into the tubular space defined by the outer circumference of the collar 15 and the inner circumference of the fibrous layer 24. As the flow thus passes into the drum, the rotation of the drum imparts a centripetal acceleration to the flow. As is well known from principles of dynamics, centripetal acceleration is the time rate of change of two separate components of velocity, these components being radial and tangential. Therefore the aerosol stream is forced radially outward with a spiralling motion. As the suspended particles pass through the fibrous material 24, collisions between the particles and fibers and between the particles themselves are significantly enhanced. Such collisions of aerosol particles are well known to be inelastic and thus the impingement will cause merging of the particles.

Because of the rotation of the drum, as the particles collected on the fibers increase in size, as a result of the inelastic collisions, said particles are forced through the fibrous mass and the perforated drum and impinge upon radial impaction plates. While obviously some of the coalesced and/or coagulated particles will pass through the fibrous media without collecting thereon, such escaping particles will be caught and collected by the impaction plates. Further, the above described action of the continuously growing particles, temporarily entrapped by the fibers, which will rapidly obtain a momentum sufficient to break away from the fibrous mass, results in a rapid and effective self-cleaning action of said fibrous mass. Of couse removal of the drive pulley 13 and upper plate 11 will allow easy access to and disassembly of the drum portion such that the fiber layer 24 may be replaced after a period of time in use.

Upon impact with the fixed radial baffle plates 21, the coalesced drops will drain down the plates, further removing a portion of the solid aggregate collected from the rapid settling, through impact, of the coagulated particles. The remainder of the aggregate is removed from the impaction plates by a continuous trickle of liquid from a series of heads (not shown) around the upper portion of the chamber interior. The solid and liquid aggregate is thus quickly removed from the plates without caking and is passed through the plurality of holes 32 about the lower portion of cone 16, and thence through a drain, for example petcock 33, at the bottom of the tank. The filtered gaseous stream is discharged from the chamber through outlet duct 20. A pair of sampling tubes 34, 35 may be provided for sampling particle content of the stream at each end of the chamber.

The size of the [areosol] *aerosol* particles to be removed will determine the required speed of rotation of the drum as well as the smoothness of acceleration of the flow. The more coarse the individual particles, the slower need be the drum speed and the thinner the layer of fibrous material required.

There is thus provided an aerosol filter unit which combines efficiency of operation with simplicity of structure and the additional advantages hereinbefore mentioned. The filter unit has immediate use in filtration of all types of aerosols such as oil smoke, pollen, fog, and others too numerous to list. While a particular embodiment of the invention has been disclosed in accordance with the patent statute, it is obvious that various modifications of the structure involved may be made which would be within the scope of this invention by those having ordinary skill in the art upon a reading of the above specification. It is therefore desired that the invention be limited only by a liberal interpretation of the appended [claim] *claims.*

What is claimed and desired to be secured by United States Letters Patent is:

*1.* A filter for removing aerosol particles from a gaseous stream, comprising a cylindrical chamber having an inlet duct along the center of the chamber for introducing said stream into said chamber and a peripheral outlet duct for discharging the filtered stream, a perforated drum connected to a rotatable shaft supported within said chamber in bearings, a tubular layer of fibrous media disposed within the inner surface of said drum, means for rotating said shaft and thereby said drum, a plurality of equally spaced radial impaction plates mounted longitudinally along and slightly away from the inner periphery of said chamber and extending inward therefrom toward said drum, and means for removing from said chamber the aggregate filtered from said stream.

*2. Mechanical aerosol filtering apparatus comprising*

*(a) a housing with inlet and outlet means for stream of gas containing aerosol particles to be filtered,*

*(b) a shaft rotatable within said housing,*

*(c) a tubular filter body containing a mass of fibrous media attached to said shaft and providing a first cylindrical space bounded by the inner surface of said filter body and extending axially along the entire length thereof to which first space the inflowing gas is admitted through said inlet means at one end of said first space,*

*(d) a cover closing said body and the end of said first space at the end thereof opposite to said one end and providing a third space between said cover and the end of said housing adjacent thereto,*

*(e) said tubular body having an outer diameter somewhat less than the inner diameter of the inner surface of said housing filling a peripheral space in said housing and extending without interruption substantially through the entire length of said housing and providing a second space between the outside surface thereof and the inside surface of said housing and communicating with said third space and with said outlet means at a location adjacent the end of said first space opposite said one end thereof, such that inflowing gas enters at said inlet means and spirals continuously through the axial length of said filter body before leaving at said outlet means as the shaft rotates said body whereby said aerosol particles in said stream of gas are subjected to increasing centrifugal forces from the inner surface to the outer surface of said filter body so that collisions between particles and said filter body and among the particles themselves occur more slowly at the inner portions of the filter body and more rapidly towards the outer periphery of the filter body so as to grow in size and be thrown outwardly from said body against the inner surface of said housing.*

*3. The invention as set forth in claim 2 wherein said inlet means comprises a port disposed at one end of said housing in communication with said one end of said first space, and wherein said outlet means comprises another port in communication with said second space disposed near the opposite end of said housing at the side thereof.*

*4. The invention as set forth in claim 2 including a perforated drum having end faces for attaching said drum and said filter body to said shaft, said filter body being disposed inside said drum with the outer surface thereof along the inner surface of said drum.*

*5. The invention as set forth in claim 4 including variable speed drive means connected to said shaft for adjusting the rotational speed of said drum and said tubular filter body to the different density of the aerosol to be filtered.*

*6. The invention as set forth in claim 4 wherein said outlet means port also communicates with said third space.*

References Cited

The following references, cited by the Examiner, are of record in the patented file of this patent or the original patent.

UNITED STATES PATENTS

| | | | |
|---|---|---|---|
| 1,075,736 | 10/1913 | Spiegel | 55—400 |
| 1,292,561 | 1/1919 | Baldwin | 55—401 |
| 1,690,813 | 11/1928 | Birkholz | 55—400 |
| 1,773,840 | 8/1930 | Nattcher et al. | 55—130 |
| 2,792,909 | 5/1957 | Court | 55—405 |
| 3,022,776 | 2/1962 | Steinlein et al. | 55—408 X |
| 3,123,286 | 3/1964 | Abbott | 55—400 X |

FOREIGN PATENTS

| | | |
|---|---|---|
| 532,467 | 1/1941 | Great Britain. |

JOHN W. ADEE, Primary Examiner